United States Patent [19]

Chauvin et al.

[11] Patent Number: 4,725,041

[45] Date of Patent: Feb. 16, 1988

[54] FUEL INJECTION APPARATUS AND SYSTEM

[75] Inventors: Richard Chauvin, Clawson; Lawrence McAuliffe, Jr., Southfield, both of Mich.

[73] Assignee: Colt Industries Inc, New York, N.Y.

[21] Appl. No.: 941,313

[22] Filed: Dec. 15, 1986

Related U.S. Application Data

[63] Continuation of Ser. No. 812,930, Dec. 23, 1985, abandoned, which is a continuation of Ser. No. 756,012, Jul. 17, 1985, abandoned, which is a continuation of Ser. No. 600,834, Apr. 16, 1984, abandoned.

[51] Int. Cl.[4] .............................................. F16K 31/02

[52] U.S. Cl. ................................ 251/129.15; 239/585

[58] Field of Search ...................... 251/129.01, 129.05, 251/129.15, 84; 239/585; 335/261, 262, 279; 123/470, 472

[56] References Cited

U.S. PATENT DOCUMENTS

| | | | |
|---|---|---|---|
| 4,218,021 | 8/1980 | Palma | 239/585 |
| 4,342,427 | 8/1982 | Gray | 239/585 |
| 4,454,990 | 8/1985 | Lewis | 239/585 |

*Primary Examiner*—James C. Young

*Assistant Examiner*—Noah Kamen

*Attorney, Agent, or Firm*—Walter Potoroka, Sr.

[57] ABSTRACT

A fuel metering apparatus is shown as having a throttle body with an induction passage therethrough and a throttle valve for controlling flow through the induction passage, a fuel-air mixture discharge member is situated generally in the induction passage downstream of the throttle valve, an air passage communicates between a source of air and the fuel-air mixture discharge member, the air passage is shown as also including a flow restrictor therein which provides for sonic flow therethrough, and a fuel metering valving assembly having a ball valve member is effective for metering liquid fuel as at a superatmospheric pressure and delivering such metered liquid fuel as into the air passage upstream of the flow restrictor thereby causing the thusly metered liquid fuel and air to pass through the sonic flow restrictor before being discharged into the induction passage by the fuel-air mixture discharge member, the ball valve member has a flattened surface against which an armature of a solenoid assembly operatively engages and through the action of at least one resilient member urges the ball valve member toward a seated condition.

10 Claims, 25 Drawing Figures

FUEL INJECTION APPARATUS AND SYSTEM

This is a continuation of application Ser. No. 812,930 filed Dec. 23, 1985 which is a continuation of application Ser. No. 756,012 filed July 17, 1985, which, in turn, is a continuation of application Ser. No. 600,834 filed Apr. 16, 1984, and all now abandoned.

FIELD OF THE INVENTION

This invention relates generally to fuel injection systems and more particularly to fuel injection systems and apparatus for metering fuel flow to an associated combustion engine.

BACKGROUND OF THE INVENTION

Even though the automotive industry has over the years, if for no other reason than seeking competitive advantages, continually exerted efforts to increase the fuel economy of automotive engines, the gains continually realized thereby have been deemed by various levels of government as being insufficient. Further, such levels of government have also arbitrarily imposed regulations specifying the maximum permissible amounts of carbon monoxide (CO), hydrocarbons (HC) and oxides of nitrogen ($NO_x$) which may be emitted by the engine exhaust gases into the atmosphere.

Unfortunately, generally, the available technology employable in attempting to attain increases in engine fuel economy is contrary to that technology employable in attempting to meet the governmentally imposed standards on exhaust emissions.

For example, the prior art in attempting to meet the standards for $NO_x$ emissions has employed a system of exhaust gas recirculation whereby at least a portion of the exhaust gas is re-introduced into the cylinder combustion chamber to thereby lower the combustion temperature therein and consequently reduce the formation of $NO_x$.

The prior art has also proposed the use of engine crankcase recirculation means whereby the vapors which might otherwise become vented to the atmosphere are introduced into the engine combustion chambers for further burning.

The prior art has also proposed the use of fuel metering means which are effective for metering a relatively overly rich (in terms of fuel) fuel-air mixture to the engine combustion chamber means as to thereby reduce the creation of $NO_x$ within the combustion chamber. The use of such overly rich fuel-air mixtures results in a substantial increase in CO and HC in the engine exhaust which, in turn, requires the supplying of additional oxygen, as by an associated air pump, to such engine exhaust in order to complete the oxidation of the CO and HC prior to its delivery into the atmosphere.

The prior art has also heretofore proposed employing the retarding of the engine ignition timing as a further means for reducing the creation of $NO_x$. Also, lower engine compression ratios have been employed in order to lower the resulting combustion temperature within the engine combustion chamber and thereby reduce the creation of $NO_x$. In this connection the prior art has employed what is generally known as a dual bed catalyst. That is, a chemically reducing first catalyst is situated in the stream of exhaust gases at a location generally nearer the engine while a chemically oxidizing second catalyst is situated in the stream of exhaust gases at a location generally further away from the engine and downstream of the first catalyst. The relatively high concentrations of CO resulting from the overly rich fuel-air mixture are used as the reducing agent for $NO_x$ in the first catalyst while extra air supplied (as by an associated pump) to the stream of exhaust gases, at a location generally between the two catalysts, serves as the oxidizing agent in the second catalyst. Such systems have been found to have various objections in that, for example, they are comparatively very costly requirin9 additional conduitry, air pump means and an extra catalyst bed. Further, in such systems, there is a tendency to form ammonia which, in turn, may or may not be reconverted to $NO_x$ in the oxidizing catalyst bed.

The prior art has also proposed the use of fuel metering injection means for eliminating the usually employed carbureting apparatus and, under superatmospheric pressure, injecting the fuel through individual nozzles directly into the respective cylinders of a piston type internal combustion engine. Such fuel injection systems, besides being costly, have not proven to be generally successful in that the system is required to provide metered fuel flow over a very wide range of metered fuel flows. Generally, those prior art injection systems which are very accurate at one end of the required range of metered fuel flows, are relatively inaccurate at the opposite end of that same range of metered fuel flows. Also, those prior art injection systems which are made to be accurate in the mid-portion of the required range of metered fuel flows are usually relatively inaccurate at both ends of that same range. The use of feedback means for altering the metering characteristics of such prior art fuel injection systems has not solved the problem of inaccurate metering because the problem usually is intertwined within such factors as: effective aperture area of the injector nozzle; comparative movement required by the associated nozzle pintle or valving member; inertia of the nozzle valving member; and nozzle "cracking" pressure (that being the pressure at which the nozzle opens). As should be apparent, the smaller the rate of metered fuel flow desired, the greater becomes the influence of such factors thereon.

It is now anticipated that the said various levels of government will be establishing even more stringent exhaust emission limits.

The prior art, in view of such anticipated requirements, with respect to $NO_x$, has suggested the employment of a "three-way" catalyst, in a single bed, within the stream of exhaust gases as a means of attaining such anticipated exhaust emission limits. Generally, a "three-way" catalyst is a single catalyst, or catalyst mixture, which catalyzes the oxidation of hydrocarbons and carbon monoxide and also the reduction of oxides of nitrogen. It has been discovered that a difficulty with such a "three-way" catalyst system is that if the fuel metering is too rich (in terms of fuel) the $NO_x$ will be reduced effectively but the oxidation of CO will be incomplete; if the fuel metering is too lean, the CO will be effectively oxidized but the reduction of $NO_x$ will be incomplete. Obviously, in order to make such a "three-way" catalyst system operative, it is necessary to have very accurate control over the fuel metering function of the associated fuel metering supply means feeding the engine. As hereinbefore described, the prior art has suggested the use of fuel injection means, employing respective nozzles for each engine combustion chamber, with associated feedback means (responsive to selected indicia of engine operating conditions and parameters) intended to continuously alter or modify the metering characteristics of the fuel injection means. However, as also hereinbefore indicated, such fuel injection systems have not proven to be successful.

It has also heretofore been proposed to employ fuel metering means, of a carbureting type, with feedback means responsive to the presence of selected constituents comprising the engine exhaust gases. Such feedback means were employed to modify the action of a main metering rod of a main fuel metering system of a carburetor. However, tests and experience have indicated that such a prior art carburetor and such a related feedback means can never provide the degree of accuracy required in the metering of fuel to an associated engine as to assure meeting, for example, the said anticipated exhaust emission standards.

It has also heretofore been proposed to employ fuel injection type metering means wherein such metering means comprises solenoid valving means and more particularly valving means carried by the solenoid armature. Although this general type of metering means has proven to be effective in its metering function, the cost of producing such solenoid valving means has been generally prohibitive.

Further, various prior art structures have experienced problems in being able to supply metered fuel, at either a proper rate or in a proper manner, as to provide for a smooth engine and/or vehicle acceleration when such is demanded.

Accordingly, the invention as disclosed and described is directed, primarily to the solution of such and other related and attendant problems of the prior art.

SUMMARY OF THE INVENTION

According to the invention, a valving assembly for variably restricting fluid flow, comprises housing means, electrical field coil means carried by said housing means, pole-piece means situated generally within said field coil means, a valve seat member, fluid flow passage means formed through said valve seat member, said pole-piece means comprising a pole-piece axial end portion, a ball valve member situated generally between said end portion and said valve seat member, armature means situated generally within said field coil means, and resilient means normally resiliently urging said ball valve member toward operative seating engagement with said valve seat member as to thereby terminate flow through said fluid flow passage means, said ball valve member comprising a flatted surface against which said armature means is in operative engagement and through the action of said resilient means urges said ball valve member toward said operative seating engagement with said valve seat member.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted.

DETAILED DESCRIPTION OF THE PREFERRED EMBODIMENT

Figure 1:
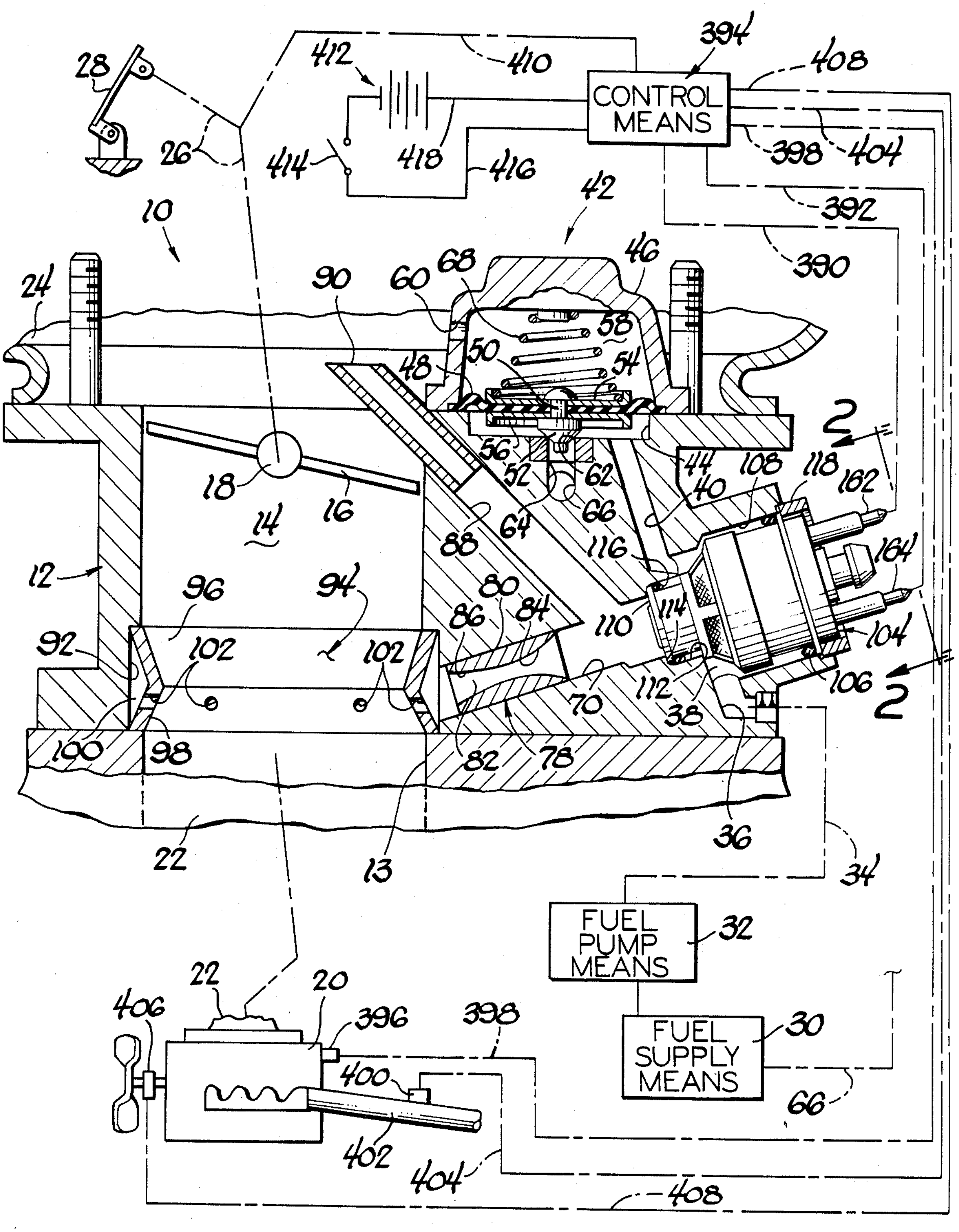
FIG. 1 illustrates, mostly in cross-section, a fuel injection apparatus and system employing teachings of the invention.

Referring now in greater detail to the drawings, FIG. 1 illustrates fuel injection apparatus 10 and system comprised as of induction body or housing means 12 having induction passage means 14 wherein a throttle valve 16 is situated and carried as by a rotatable throttle shaft 18 for rotation therewith thereby variably restricting the flow of air through the induction passage means 14 and into the engine 20 as via associated engine intake manifold means 22. If desired suitable air cleaner means may be provided as to generally encompass the inlet of induction passage means 14 as generally fragmentarily depicted at 24. The throttle valve means 16 may be suitably operatively connected as through related linkage and motion transmitting means 26 to the operator positioned throttle control means which, as generally depicted, may be the operator foot-operated throttle pedal or lever 28 as usually provided in automotive vehicles.

A source of fuel as, for example, a vehicular gasoline tank 30, supplies fuel to associated fuel pumping means 32 which, in turn, delivers unmetered fuel as via conduit means 34 to conduit means 36 leading as to a chamber portion 38 which, in turn, communicates with passage or conduit means 40 leading to pressure regulator means 42. As generally depicted, the pressure regulator means 42 may comprise a recess or chamber like portion 44 formed in body 12 and a cup-like cover member 46. A deflectable diaphragm 48, operatively secured as to the stem portion 50 of a valving member 52 as through opposed diaphragm backing plates 54 and 56, is generally peripherally contained and retained between cooperating portions of body 12 and cover 46 as to thereby define variable and distinct chambers 44 and 58 with chamber 58 being vented as to a source of ambient atmospheric pressure as through vent or passage means 60. A valve seat or orifice member 62 cooperates with valving member 52 for controllably allowing flow of fuel therebetween and into passage means 64 and fuel return conduit means 66 which, as depicted, preferably returns the excess fuel to the fuel supply means 30. Spring means 68 situated as within chamber means 58 operatively engages diaphragm means 48 and resiliently urges valving member 52 closed against valve seat 62.

Generally, unmetered fuel may be provided to conduit means 36 and chamber 38 at a pressure of, for example, slightly in excess of 10.0 p.s.i. Passage 40 communicates such pressure to chamber 44 where it acts against diaphragm 48 and spring means 68 which are selected as to open valving member 52 in order to thereby vent some of the fuel and pressure as to maintain an unmetered fuel pressure of 10.0 p.s.i.

Chamber 38 is, at times, placed in communication with metered fuel passage means 70 as through metered fuel orifice means 72 comprising, in the preferred embodiment of the invention, a portion of the overall fuel metering assembly 104 which, in FIG. 1 is shown in elevation and not in cross-section. Passage means 70 may also contain therein venturi means 78 which may take the form of an insert like member having a body 80 with a venturi passage 82 formed therethrough as to have a converging inlet or upstream surface portion 84 leading to a venturi throat from which a diffuser surface portion 86 extends downstream. A conduit 88 shown as having one end 90 communicating as with a source of ambient atmosphere has its other end communicating with metered fuel passage means 70 as at a point or area upstream of venturi restriction means 78 and, generally, downstream of metered fuel passage means 72.

A counterbore or annular recess 92 in body means 12 is illustrated as closely receiving therein an annular or ring-like member 94 which may have an upper or upstream annular body portion 96 which converges and a lower or downstream annular body portion 98 which diverges. The coacting converging and diverging wall portions of annular member 94, in turn, cooperate with recess 92 to define therebetween an annulus or annular space 100 which communicates with metered fuel passage means 70 and the downstream or outlet end of restriction means 78. A plurality of discharge orifice means 102 may be formed, in angularly spaced relationship, in annular member 94 as to be generally circumferentially thereabout. Further, such discharge orifice means may be formed in the downstream diverging portion 98 as to be at or below the general area of juncture between upstream and downstream annular portions 96 and 98.

Passage 72 is formed through a valve seat member 74 preferably operatively carried by an oscillator type valving means or assembly 104. The metering assembly 104 is illustrated in FIG. 1 as being received within a bore 108 in body means 12 and is sealed thereto as by a cooperating O-ring seal 106. The generally left-most end 110 (as viewed in FIG. 1) of metering assembly 104 is preferably closely received in a bore 112, formed in body 12, and may be axially abutted as against a cooperating shoulder portion 114. An O-ring seal 116 prevents leakage from bore 112 to passage means 70. As is generally depicted in FIG. 1, preferably there is a significant clearance space about the main portion of metering means 104 with seals 106 and 116 serving as fluid sealing walls at opposite ends. A collar or ring-like retainer 118, which may include tab-like portions (not shown) with screws passing therethrough and into body portion 12, may be employed for maintaining the metering means 104 in assembled relationship to the main body 12.

Figure 2:
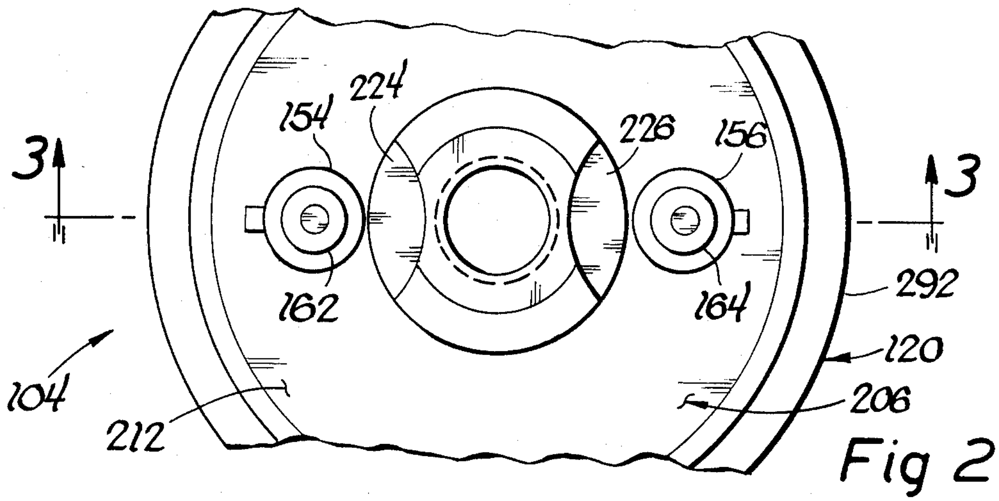
FIG. 2 is a fragmentary end elevational view taken generally on the plane of line 2—2 of FIG. 1 and looking in the direction of the arrows.
Figure 4:
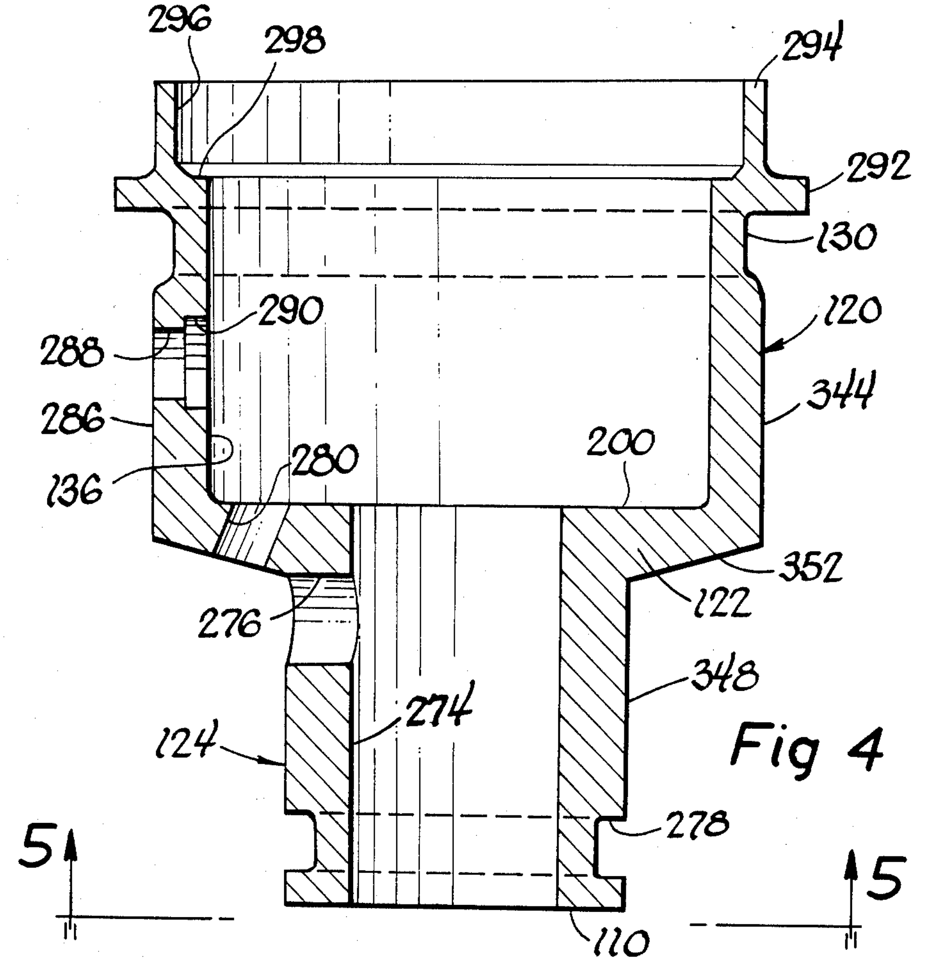
FIG. 4 is an axial cross-sectional view of one of the elements shown in FIG. 3.

Referring now also to FIGS. 2 and 4, the metering valving means 104 is illustrated as comprising a generally tubular outer housing 120 having a lower (as viewed in FIGS. 2 and 4) end wall 122 the outer surface of which defines a face 352. A generally tubular extension 124 is preferably formed integrally with end wall 122 and receives a valve seat member 74 which is preferably press-fitted therein. The housing 120 is provided with a circumferential groove 130 for the reception of annular seal 106.

The cylindrical inner surface 136 of housing 120 closely receives bobbin means 138 which, FIGS. 3, 12, 15 and 17, is illustrated as comprising a generally tubular body portion 140 with integrally formed radially extending annular flange or wall portions 142 and 144 at generally opposite ends thereof. An electrical coil or winding 146 is carried generally about bobbin tubular body 140 and situated axially between flange wall portions 142 and 144.

Preferably, the bobbin means 138 is provided with a generally upper (as viewed in any of FIGS. 3, 12 or 15) body portion 148 which has a relatively enlarged (compared to tubular portion 140) cylindrical portion 150 which, in turn, is integrally formed with an upper radially outwardly directed flange-like or disc-like portion 152. A pair of axially extending and spaced extensions 154 and 156 are preferably integrally molded with disc or flange portion 152 and respectively contain, as molded therein, generally tubular electrical conductors 158 and 160 which, in turn, have exposed portions 162 and 164 for connection to associated electrical conductor means. As possibly best seen in FIGS. 14 and 15, the tubular electrical conductors 158 and 160 are respectively provided with depending extensions 166 and 168 which, in turn, have generally laterally extending arm or tab-like portions 170 and 172, respectively.

Figure 17:
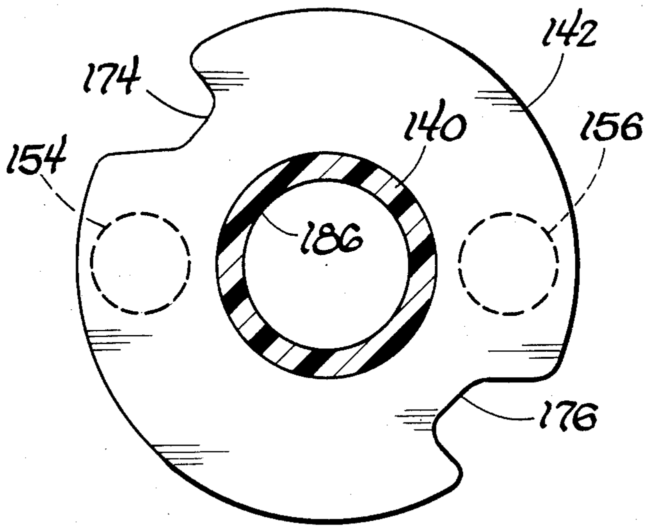
FIG. 17 is a cross-sectional view taken generally on the plane of line 17—17 of FIG. 15 and looking in the direction of the arrows.

As best seen in FIG. 17, the flange 142 is preferably provided with respective cut-out like or recess portions 174 and 176 for providing space through which the opposite electrical ends of winding or coil means 146 can pass as to, in turn, be respectively electrically connected to the tabs or arms 170 and 172. After such electrical connection is made, the tabs or arms 170 and 172 are bent generally radially inwardly as to be axially between flange portions 142 and 152 and within their outer cylindrical surfaces.

Figure 3:
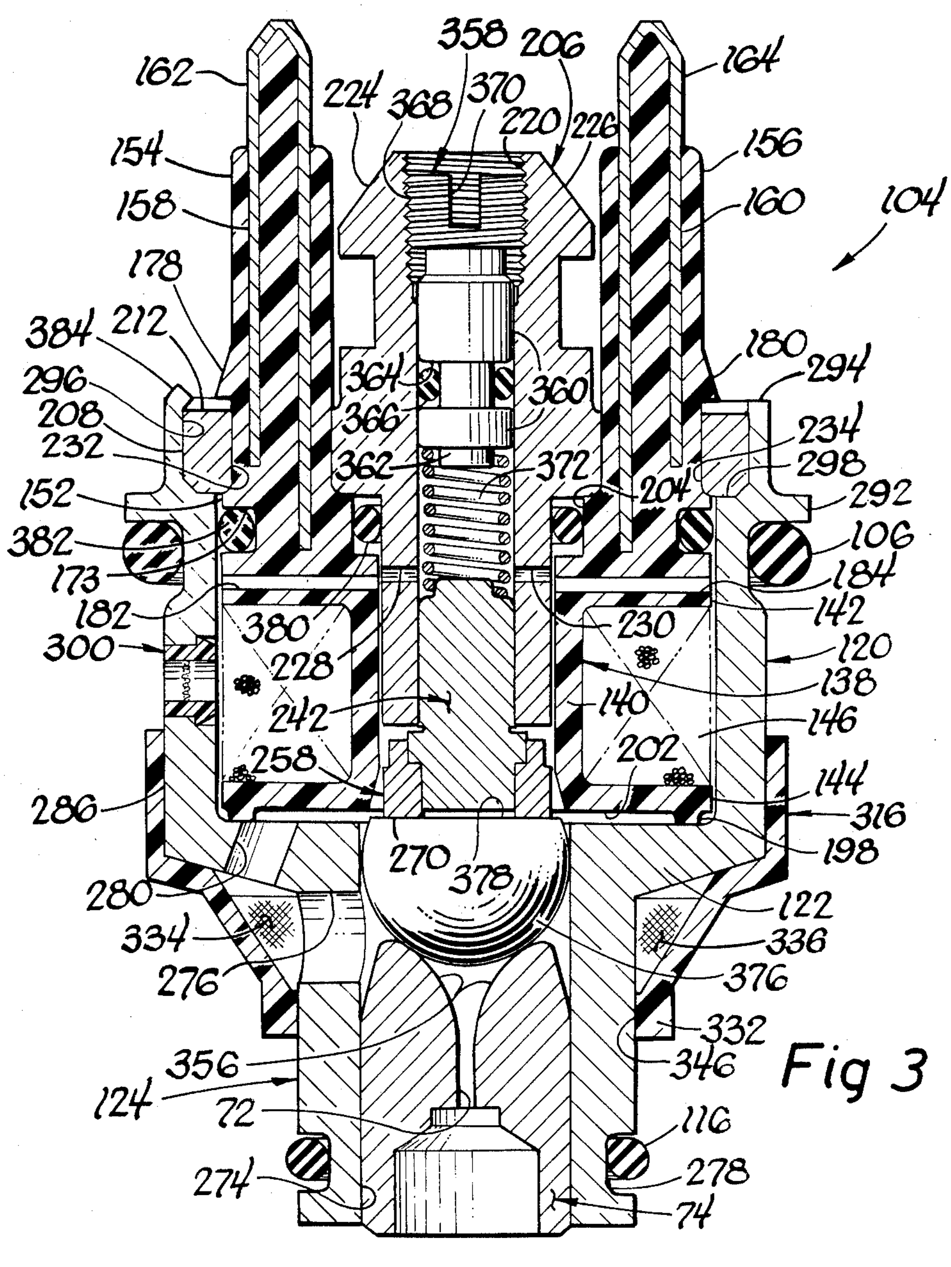
FIG. 3 is an axial cross-sectional view taken generally on the plane of line 3—3 of FIG. 2 and looking in the direction of the arrows.
Figure 14:
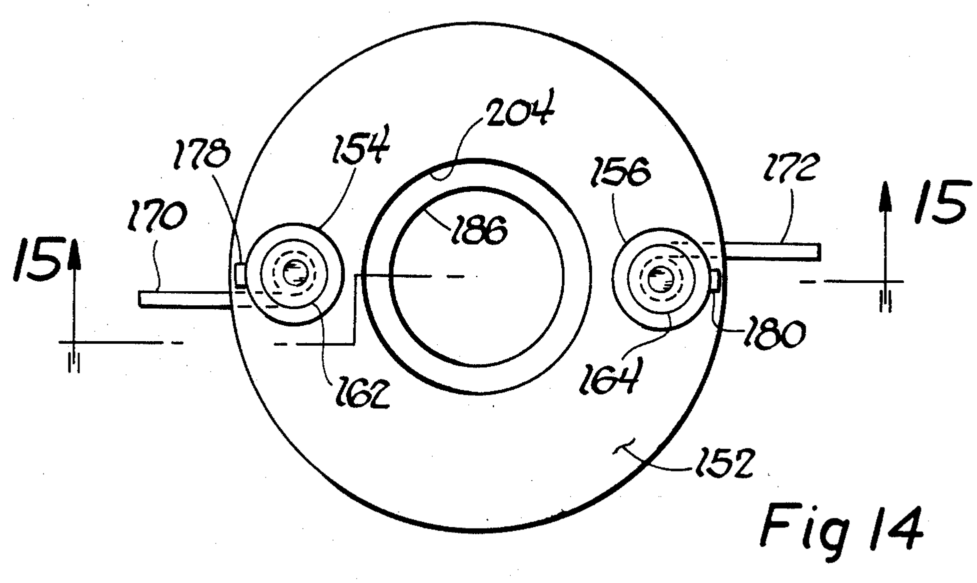
FIG. 14 is an end elevational view taken generally on the plane of line 14—14 of FIG. 12 and rotated 90° out of position.
Figure 15:
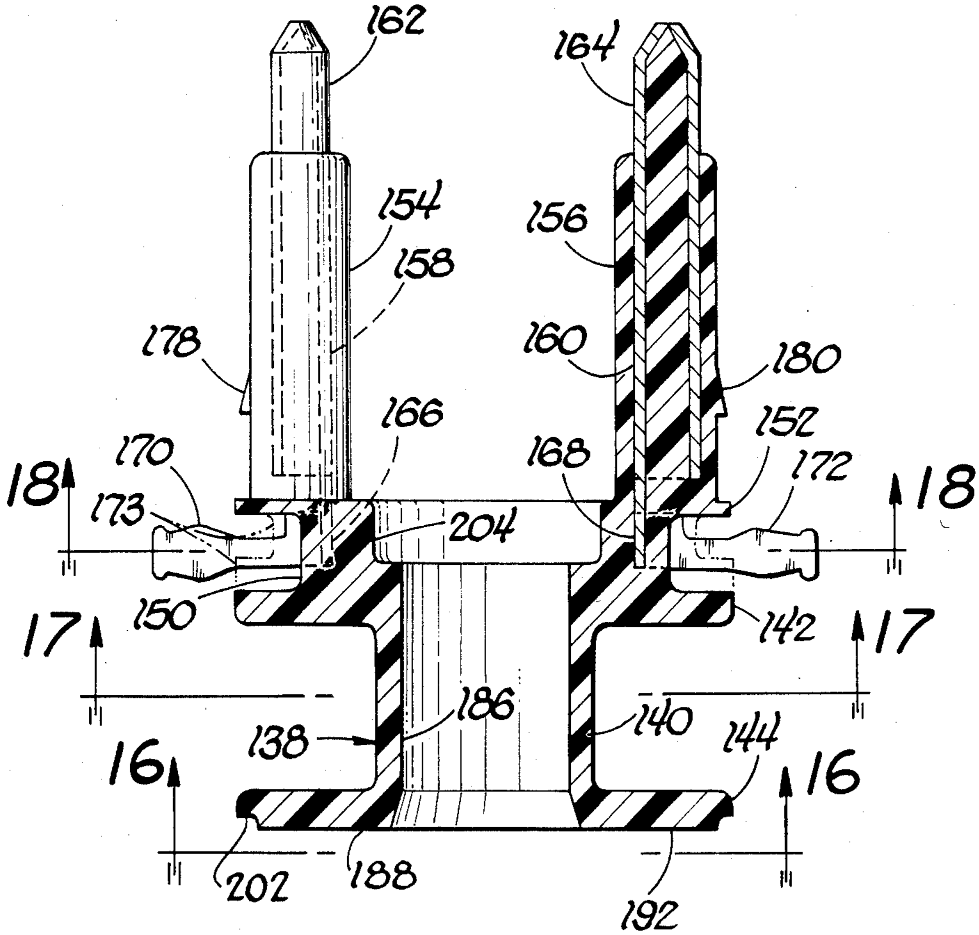
FIG. 15 is a cross-sectional view taken generally on the plane of line 15—15 of FIG. 14 and looking in the direction of the arrows.
Figure 18:
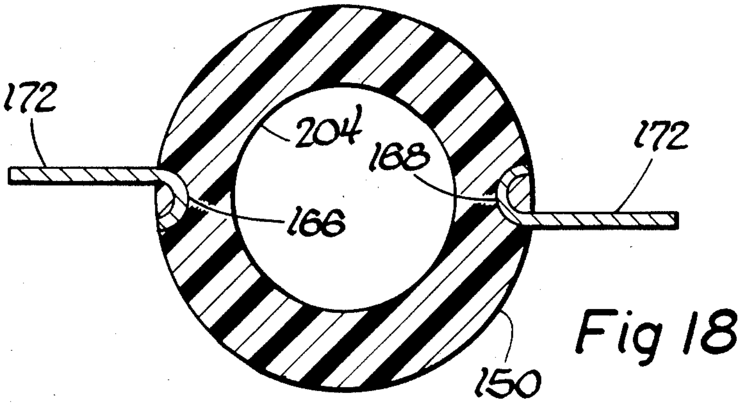
FIG. 18 is a cross-sectional view taken generally on the plane of line 18—18 of FIG. 15 and looking in the direction of the arrows.

As shown in each of FIGS. 3, 14 and 15, the extensions 154 and 156 are preferably provided with integrally molded ramp-like portions 178 and 180 which are relatively resiliently inwardly deflectable.

Figure 12:
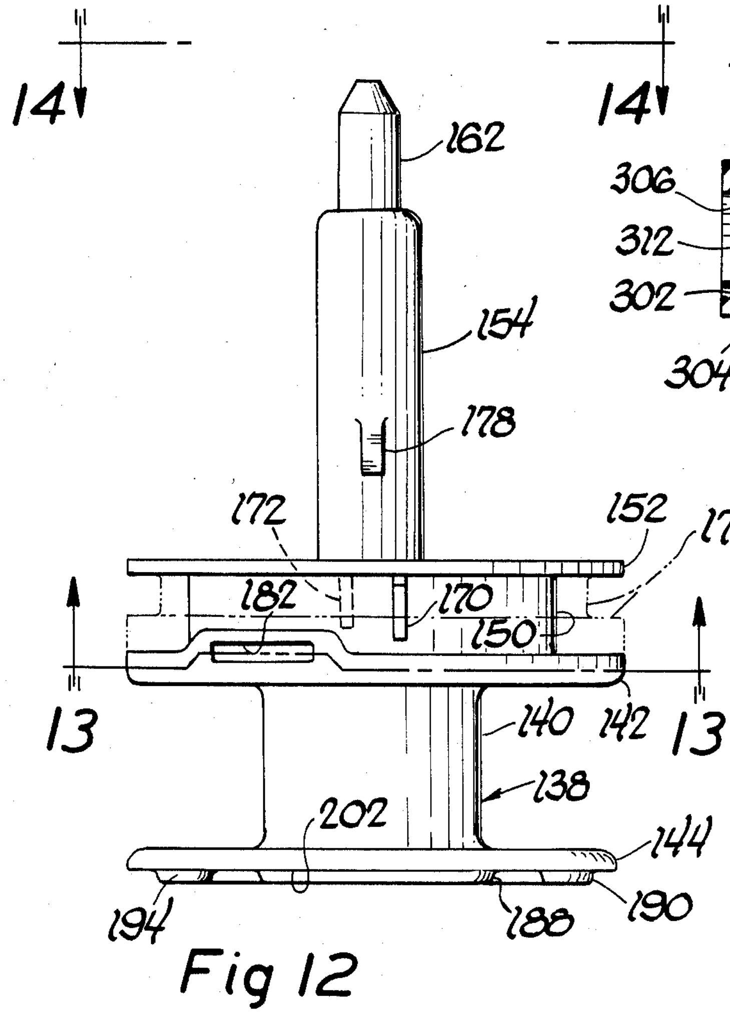
FIG. 12 is a side elevational view of one of the elements shown in FIG. 3.
Figure 13:
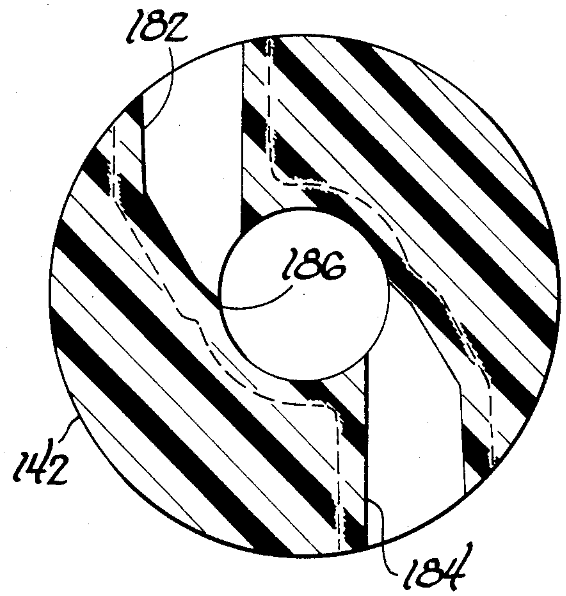
FIG. 13 is a cross-sectional view taken generally on the plane of line 13—13 of FIG. 12 and looking in the direction of the arrows.

As best seen in FIGS. 12 and 13, flange portion 142 is provided with generally radially directed internal passageways or conduits 182 and 184 which, at their respective radially inner ends, communicate with cylindrical passage or clearance 186 of tubular portion 140.

Figure 16:
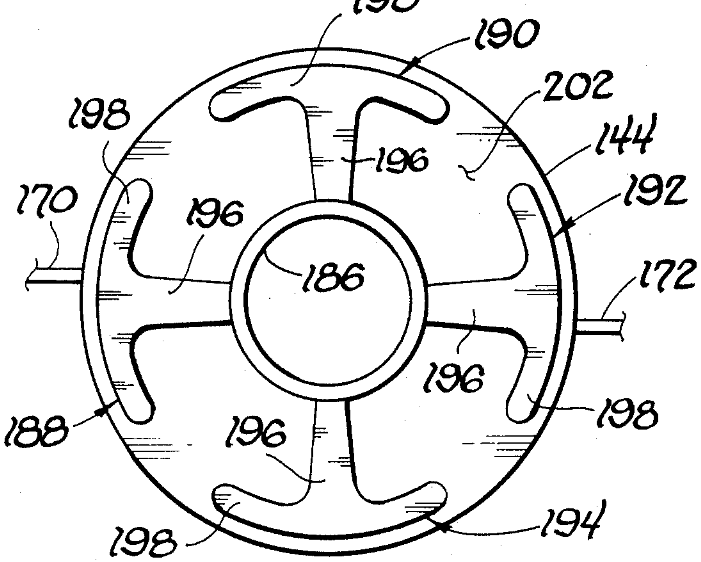
FIG. 16 is an end elevational view taken generally on the plane of line 16—16 of FIG. 15 and looking in the direction of the arrows.

In the preferred embodiment, the bobbin means 138 is provided with a plurality of pad or foot-like portions 188, 190, 192 and 194 as best seen in FIGS. 12, 15 and 16. Typically, each of the foot-like portions is preferably comprised of a radially extending portion 196 integrally formed with an outer arcuate segment 198. Such foot-like portions, as best seen in FIG. 3, operatively abut against juxtaposed surface 200 of housing wall 122 and thereby provide for flow space as to exist both between such surface 200 and the axial end surface 202 of bobbin flange 144 as well as between the angularly spaced arcuate segments 198 and integrally formed radiating portions 196. As shown in, for example, FIGS. 3 and 15, a counterbore-like enlargement 204 is formed in bobbin means 138 as to be in substantial axial alignment with passage 186. The bobbin means 138 is preferably formed of molded glass filled nylon and heat stabilized.

After the bobbin body means and contact assembly 138 is formed, as depicted in FIGS. 14–18 and as described, and the field coil is formed between flanges 142 and 144 and electrically connected to terminal portions 170 and 172, the portions 170 and 172 are bent back toward the outer surface of recess or groove 150 and the assembly is then again placed in a mold and further dielectric material (as, for example, glass filled nylon) is added and molded to the bobbin means as to partially fill the recess 150 thereby covering the then bent-back terminal portions 170 and 172 and defining an annular groove 173 as depicted in phantom line in FIGS. 12 and 15 and in solid line in FIG. 3.

Figure 19:
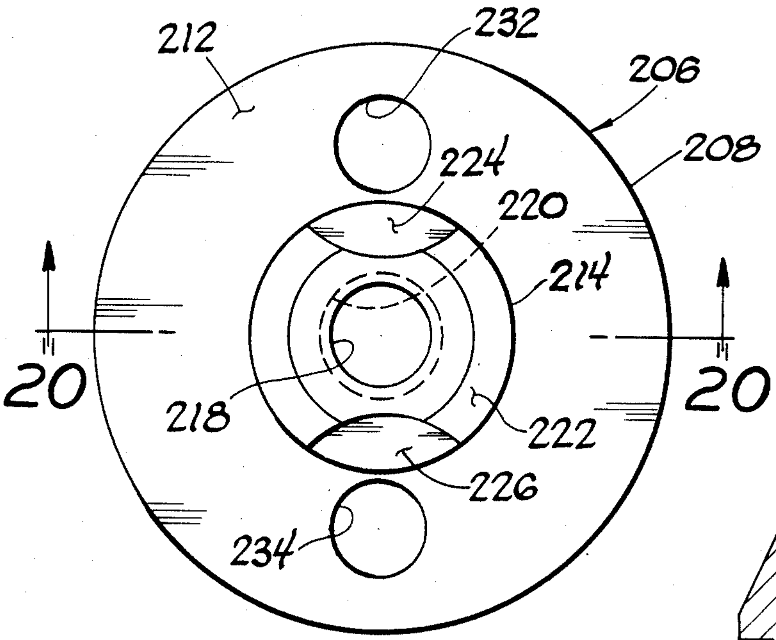
FIG. 19 is an elevational axial end view of one of the elements shown in FIG. 3 and rotated 90° out of position.
Figure 20:
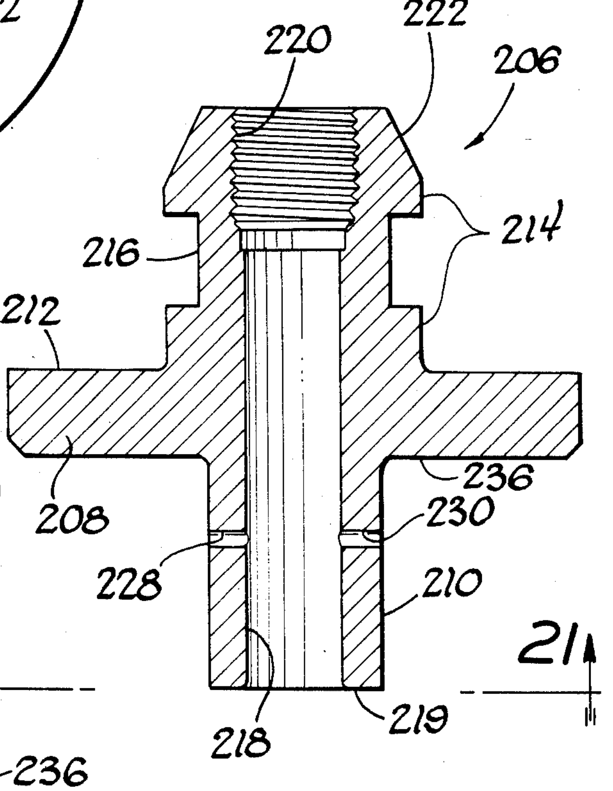
FIG. 20 is a cross-sectional view taken generally on the plane of line 20—20 of FIG. 19 and looking in the direction of the arrows.
Figure 21:
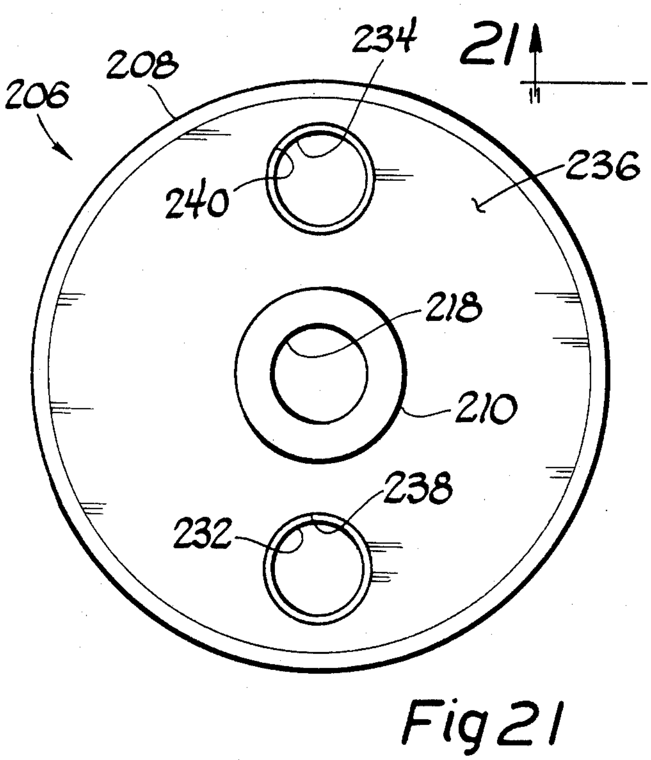
FIG. 21 is an elevational axial end view taken generally on the plane of line 21—21 of FIG. 20 and looking in the direction of the arrows.

Referring now in greater detail to FIGS. 19, 20 and 21, a pole piece 206 is illustrated as comprising a flange-like cylindrical main body portion 208 which is integrally formed with an axially aligned depending cylindrical portion 210 of comparatively reduced diameter. The upper surface 212 of body 208 may be provided with an integrally formed upwardly directed tubular extension 214 provided as with an annular recess 216 formed therein. In certain applications it may be desirable to maintain the metering means 104 in assembled relationship to the associated body, as 12, by a yoke type clamp, or the like, and in such situations the clamp may be received by the recess 216. A clearance passageway 218 is formed through extensions 214 and 210 as well as body 208 and an internally threaded portion 220 is formed as at the upper portion of upper extension 214. The upper end of extension 214 may be formed as with a conical surface 222 and further chamfered as at 224 and 226 in order to provide for extra clearance for the associated electrical connectors to be connected to electrical terminals 162 and 164 (also see FIG. 3). In the lower extension 210, a pair of conduits or passages 228 and 230 are formed through the wall thereof as to be radially directed and preferably diametrically opposed to each other.

Body portion 208 is also provided with diametrically opposed clearance apertures or passages 232 and 234 which, at the underside 236 of body 208 are preferably chamfered as at 238 and 240, respectively. In the preferred embodiment, the pole piece means 206 is comprised of silicon core iron or the equivalent.

Figure 23:
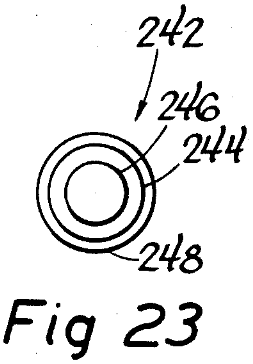
FIG. 23 is a view taken generally on the plane of line 23—23 of FIG. 22 and looking in the direction of the arrows.
Figure 22:
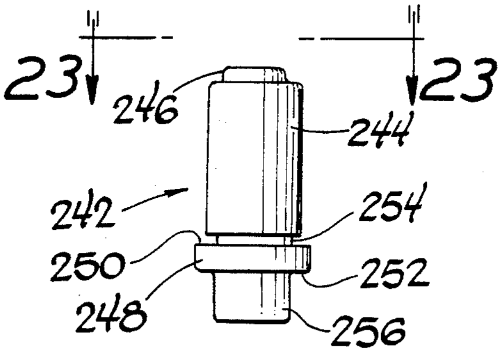
FIG. 22 is an elevational view of one of the elements shown in FIG. 3.

FIGS. 22 and 23, as well as FIG. 3, illustrate a generally cylindrical guide pin or member 242 which is preferably formed of an A.I.S.I. 300-Series non-magnetic stainless steel. More particularly, the guide member 242 is illustrated as comprising a main cylindrical body portion 244 which, at its upper end as viewed in FIG. 22, has an axial extension 246 of reduced diameter. A radiating annular flange portion 248, having an upper abutment surface 250 and a lower abutment surface 252, is situated generally at the lower end of main body 244 and somewhat spaced therefrom as by an annular undercut 254. An integrally formed cylindrical portion 256 depends from the annular flange 248.

Figure 25:
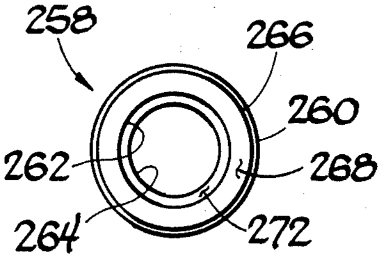
FIG. 25 is an end elevational view taken generally on the plane of line 25—25 of FIG. 24.
Figure 24:
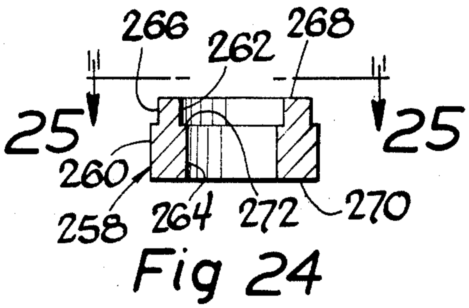
FIG. 24 is a cross-sectional view of one of the elements shown in FIG. 3.

FIGS. 24 and 25, as well as FIG. 3, illustrate a generally annular or ring-like guide shoe means 258 which is preferably formed of silicon iron. More specifically, in the preferred embodiment, the outer cylindrical surface 260, the inner cylindrical surfaces 262, 264 and the outer cylindrical surface 266, of comparatively reduced diameter, are substantially concentric while the upper generally planar surface 268 and the lower generally planar surface 270 are substantially perpendicular to the common axis of such cylindrical surfaces. The difference in diameters of inner cylindrical surfaces 262 and 264 results in an annular abutment surface 272.

Figure 5:
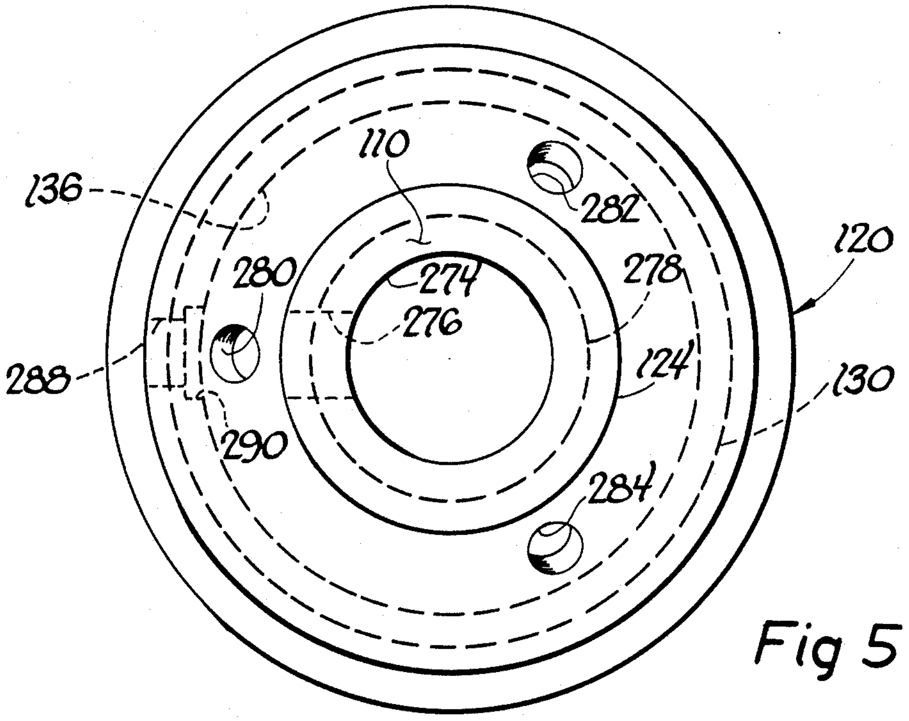
FIG. 5 is an end elevational view taken generally on the plane of line 5—5 of FIG. 4 and looking in the direction of the arrows.
Figure 7:
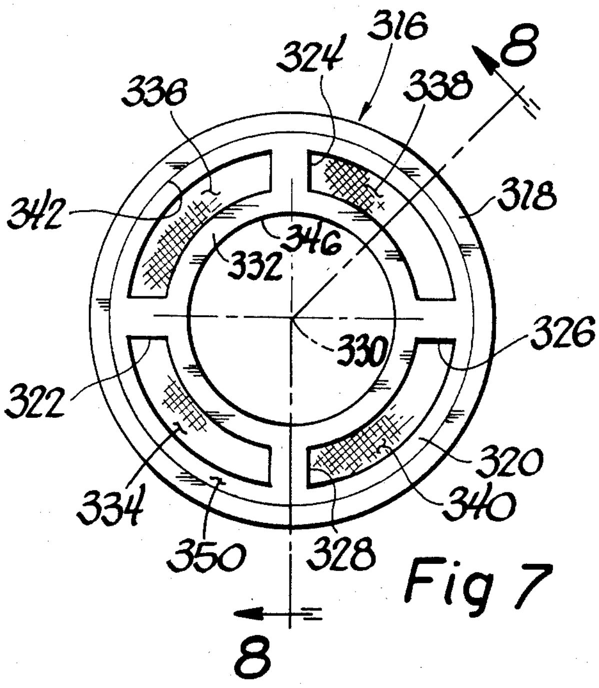
FIG. 7 is a view taken generally on the plane of line 7—7 of FIG. 6 and looking in the direction of the arrows.
Figure 8:
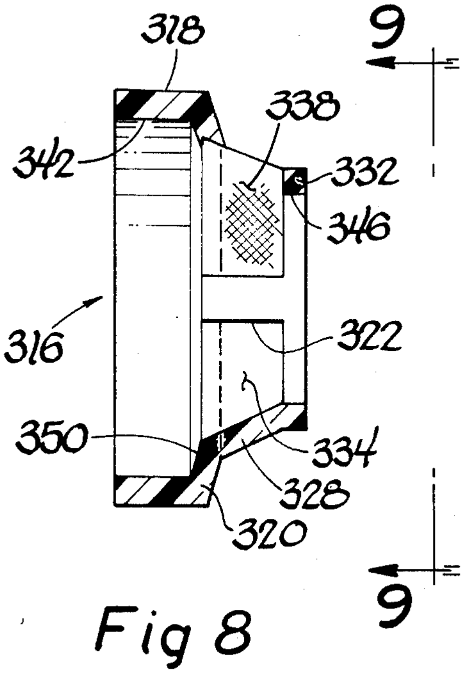
FIG. 8 is a cross-sectional view taken generally on the plane of line 8—8 of FIG. 7 and looking in the direction of the arrows.
Figure 6:
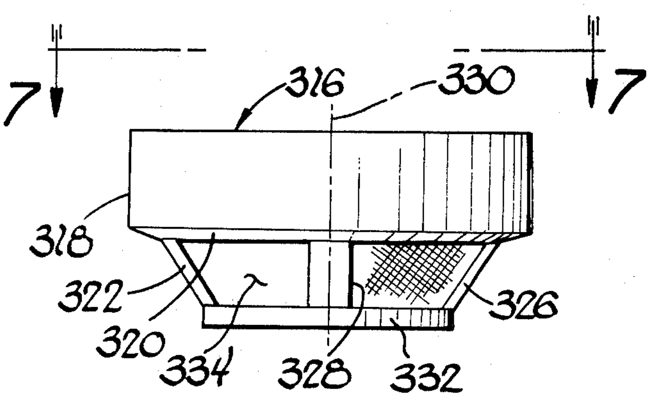
FIG. 6 is a side elevational view of one of the elements shown in both FIGS. 1 and 3.
Figure 9:
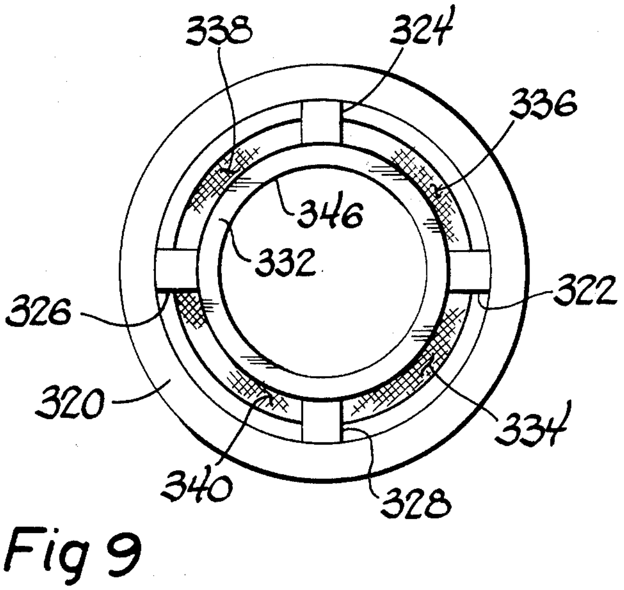
FIG. 9 is a view taken generally on the plane of line 9—9 of FIG. 8 and looking in the direction of the arrows.

Referring again to FIGS. 4 and 5, the outer housing 120, preferably formed of steel, has a cylindrical passage 274 formed through the depending extension 124 as to be substantially concentric with the cylindrical chamber 136. At least one aperture or passage 276 is formed through the wall of extension 124 as to complete communication therethrough. Preferably, near the lower end of extension 124, an annular groove 278 is formed in the outer surface thereof as to receive the O-ring 116 therein. Further, preferably a plurality of apertures or passages 280, 282 and 284 are formed through wall 122 as to each complete communication therethrough and with chamber 136. The upper cylindrical portion 286 of housing 120 is also provided with at least one passage or conduit 288, through the wall thereof, which also preferably comprises a counterbore 290. The upper portion of outer housing section 286 is provided with an outwardly radiating annular flange 292 (which may also serve to partially define annular groove 130) and a tubular cylindrical upward extension 294 which has an inner cylindrical surface 296 of a diameter substantially greater than that of chamber 136. The difference in diameters between inner cylindrical surfaces 136 and 296 permits the establishment of an annular shoulder-like abutment surface 298. The flange 292 may be employed in combination with suitable retainer means, such as that depicted, for example, at 118 of FIG. 1 for holding the metering means 104 in assembled relationship to its associated operating structure.

Figure 10:
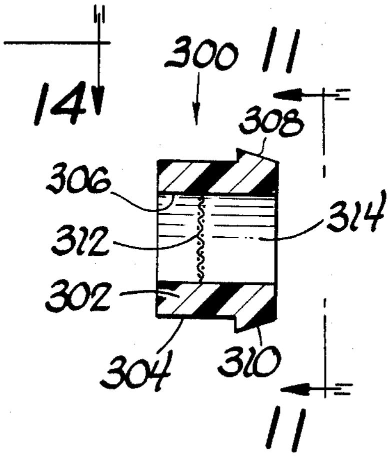
FIG. 10 is an axial cross-sectional view of one of the elements shown in FIG. 3.
Figure 11:
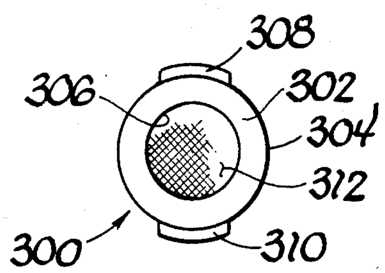
FIG. 11 is an end elevational view taken generally on the plane of line 11—11 of FIG. 10 and looking in the direction of the arrows.

FIGS. 10 and 11 illustrate, in relatively enlarged scale, a filter body assembly 300 which, as will become apparent, serves as a venting means. More particularly, the assembly 300 preferably comprises a tubular body 302 having an outer cylindrical surface 304 and an inner cylindrical surface 306. A pair of ramp-like tabs 308 and 310, preferably diametrically opposed to each other, are integrally formed with body 302 at the outer surface thereof. In the preferred embodiment, the body 302 and tabs 308, 310 are molded of 33% glass filled nylon or the equivalent. During such molding operation, it is preferred that a filter or screen member 312 be simultaneously molded in place as to be transverse of and completely across the passage 314 defined by inner cylindrical surface 306. In the preferred embodiment the filter or screen 312 is comprised of a nylon filter mesh which is 30% open.

Referring to FIGS. 6–9, an inlet filter assembly 316 is illustrated as comprising a generally ring-like or annular main body portion 318 which has an integrally formed generally radially inwardly inclined annular wall portion 320 from which a plurality of integrally formed struts 322, 324, 326 and 328 extend as to be inclined toward the axis 330 of the assembly 316. All of such struts terminate in an integrally formed lower (as viewed in FIG. 6) ring-like portion 332. The spaces existing between the struts are respectively provided with filter sections or portions 334, 336, 338 and 340. In the preferred embodiment the filter assembly 316 is molded of 33% glass filled nylon and, during such molding process, the filter sections or portions 334, 336, 338 and 340, which are preferably comprised of a 30% open nylon filter mesh, may be simultaneously securingly molded into place. Further, in the preferred embodiment, the inner cylindrical surface 342 of body 318 is of a diameter which results in a tight interference type fit with the outer cylindrical surface 344 of outer housing 120 upper portion 286; the inner cylindrical surface 346 of ring-like portion 332 is of a diameter which results in a tight interference type fit with the outer cylindrical surface 348 of outer housing 120 lower extension 124; and the inner surface 350 of inclined wall portion 320 preferably mates against the inclined under-surface 352 of outer housing 120 wall 122.

Referring to FIGS. 2 and 3, in the preferred embodiment the valve seat member 74 is of generally cylindrical configuration which is press-fitted into passage 274 of housing extension 124 and, preferably, laser welded in place. The valve seat member 74 comprises a calibrated orifice or passage means 72 which at its upper end flares generally arcuately outwardly in a smooth continuous curve as depicted generally at 356. In the preferred embodiment the valve seat member 74 is comprised of Grade 416 magnetic stainless steel. It should be mentioned that non-magnetic stainless steel appears to provide equivalent performance.

FIG. 3 also illustrates an adjustable spring seat member 358 as comprising a main body portion 360 of a generally cylindrical configuration having a depending axially extending pilot portion 362 and an annular groove 364 for the reception of a sealing O-ring 366. The upper portion of member 358 is externally threaded as at 368 as to cooperatively engage with internally threaded portion 220 of pole piece means 206. Suitable tool-engaging surface means, such as a cross-slot 370, is provided for enabling the threadable and consequent axial adjustment of member 358 by associated tool means. The body portion 360 is, of course, slidably received by the inner passage 218 of pole piece means 206.

A spring 372 is situated in passage 218 of pole piece means 206 and, at its opposite ends, abuts against spring adjustment member 358 and guide member 242, respectively, and is piloted by respective pilot portions 362 and 246.

As previously mentioned, the guide means 242 is of non-magnetic material while the annular member 258 is made of magnetic material. Further, the diameter of depending portion 256 (of guide 242) and the diameter of inner cylindrical surface 264 (of annular member 258) are such that an interference type or press fit exists therebetween while inner cylindrical surface 262 freely accommodates the flange 248 of guide 242. Once guide 242 and annular member 258 are press-fitted together, into a configuration as generally depicted in FIG. 3, they continue to function in unison as an assembly.

FIG. 3 also illustrates a ball valve member 376 which has a flatted upper disposed surface 378. In the preferred embodiment, the flatted surface 378 is eccentrically disposed relative to the center of the ball valve member 376 and may be situated, away from such center, in the order of approximately one-third the radius of the ball valve member 376. In the preferred embodiment the ball valve member 376 is formed of soft magnetic stainless steel and is of a diameter as to be closely but freely received within passage 274 of outer housing extension 124. For example, the clearance between the ball valve member 376 and passage 274 may be in the order of 0.0004 to 0.0008 inch.

In the preferred embodiment, the various components are assembled as follows. The filter or vent means 300 is inserted into openings 288 and 290 of outer housing means 120 as to have portions 308 and 310 seated within the counterbore portion 290. An "O"-ring seal 380 is placed about the outer diameter 210 of pole piece means 206. The bobbin assembly 138, including the field coil 146 already assembled thereto, is assembled to and with the pole piece means 206 (with the "O"-ring 380 situated thereon) as by inserting the extensions 154 and 156 of the bobbin assembly through cooperating apertures or passages 232 and 234, respectively, until the ramp-like detent portions 178 and 180 pass beyond the pole piece surface 212 thereby preventing the accidental disassembly of such components. At this time the "O"-ring seal 380 is sealingly contained as between the outer surface 210 of pole piece means 206 and the inner surface 204 of bobbin means 138.

An "O"-ring seal 382 may then be placed in annular groove 173 of bobbin means 138 and the sub-assembly comprised of bobbin means 138 (including field coil 146) and pole piece means 206 are inserted into outer housing 120 with pole piece flange or body 208 being contained within inner surface 296 of housing 120 and abutingly engaged against shoulder 298 of housing 120 while the foot-like portions 188, 190, 192 and 194 of bobbin means 138 are urged, by pole piece means 206, into contact with inner surface 200 of outer housing 120. The open upper end of outer housing may then be crimped, staked or rolled, generally typically depicted at 384, as against the upper surface 212 of pole piece flange 208 thereby securing the housing 120, bobbin 138, coil 146 and pole piece means 206 in assembled relationship.

The annular shoe-like member 258 is press-fitted onto the outer surface of portion 256 of guide means 242 as to axially abut against surface 252 of flange portion 248. The thusly assembled members 242 and 258 are then installed via passageway 274 as to have portion 244 of guide means 242 closely slidably received within passageway 218 of pole piece means 206.

The ball valve 376 is then inserted as via passageway 274 as to have its flatted surface 378 in engagement with surface 270 of shoe-like member 258. The valve seat means 74 is then press-fitted into passageway 274 a calculated distance whereby, with the ball valve 376 seated as on surface 356 and the shoe-like member 258 against the flatted surface 378, a gap or distance of, for example, 0.0050 inch exists as between upper surface 250 of guide flange portion 248 and the end surface 219 of pole piece means 206.

Probe-like gauging means is extended through the open upper portion of pole piece passageway 218 and operatively engaged with the guide means 242. The electrodes 162 and 164 are electrically connected to associated electrical pulse generating means causing the shoe 258 and guide 242 along with ball valve 376 to oscillatingly move axially with respect to the axis of passageway 218 of pole piece means 206. The amount of upward movement (as viewed in FIG. 3) is determined by when surface 250 of guide flange 248 abuts against pole piece end surface 219 while the distance of downward movement (as also viewed in FIG. 3) is determined by the spherical surface of ball valve 376 engaging the valve seat surface. While the guide 242, shoe-like member 258 and ball 376 continue to experience such oscillations, the valve seat 74 is further pressed into passageway until the probe means senses that such are experiencing a maximum travel of, for example, 0.0030 inch which, of course, means that when such elements are in their respective positions as depicted in FIG. 3, a 0.0030 inch gap exists as between abutment surface 250 of guide flange 248 and the end surface 219 of pole piece means 206. At that time the further pressing of valve seat means 74 is terminated, the cyclic energization of coil means 146 is terminated and the probe means withdrawn from passageway 218. Preferably, the valve seat 74 is then laser welded against any undesired movement relative to housing 120.

The spring 372 is then inserted into the upper open end of passageway 218 as to engage guide means 242 and the adjustment screw 358, equipped with an "O"-ring seal 366, is inserted into passageway 218 and threadably engaged with threaded portion 220 of pole piece means 206. The outer "O"-ring seal 106 is then placed into coacting groove 130 of outer housing 120 and the filter means 316 is then pressed onto or otherwise suitably secured to outer housing 120 as to assume a position as generally depicted in FIG. 3. Finally, the "O"-ring seal 116 is placed in its cooperating groove 278.

The assembly 104 is then placed into a flow gauging apparatus whereby all fluid flow to and through the assembly 104 passes through the filter portions 334, 336, 338 and 340 of inlet filter means 316.

The electrodes or terminals 162 and 164 are operatively connected to an electrical pulse generator which may be set to provide a predetermined electrical pulse width and/or cycle. Fuel, or fuel simulating fluid, is supplied via port means or conduit means 276 and as the ball valve 376 is oscillatingly opened and closed, relative to valve seat means 74, flows out through metered fuel discharge passage means. The pressure differential of the fluid across the ball valve 376 and valve seat 74 is maintained substantially constant. Therefore, with the two variables, namely electrical pulse width and/or cycle and the pressure differential being held substantially constant, all that needs to be done to obtain the corresponding desired rate of fluid flow is to adjust the spring tension of spring means 372. Generally, the greater the pre-load on spring 372, the lesser the rate of metered fluid flow. When the pre-load on spring 372 is adjusted, via adjustment means 358, as to provide the desired rate of metered fluid flow, the screw or adjustment means 358 is locked in place by any suitable means as, for example, by staking.

The thusly calibrated assembly 104 is then removed from the flow gauging apparatus and is ready for use in an associated fuel metering system as generally depicted in FIG. 1. Terminal means 162 and 164 may be respectively electrically connected as via conductor means 390 and 392 to related control means 394. As should already be apparent, the metering means 104 is of the duty cycle type wherein the winding or coil means 146 is intermittently energized thereby causing, during such energization, valve member 376 to move in a direction away from valve seat member 74. Consequently, the effective flow area of valve orifice or passage 72 can be variably and controllably determined by controlling the frequency and/or duration of the energization of coil means 146.

The control means 394 may comprise, for example, suitable electronic logic type control and power outlet means effective to receive one or more parameter type input signals and in response thereto produce related outputs. For example, engine temperature responsive transducer means 396 may provide a signal via transmission means 398 to control means 394 indicative of the engine temperature; sensor means 400 may sense the relative oxygen content of the engine exhaust gases (as within engine exhaust conduit means 402) and provide a signal indicative thereof via transmission means 404 to control means 394; engine speed responsive transducer means 406 may provide a signal indicative of engine speed via transmission means 408 to control means 394 while engine load, as indicated for example by throttle valve 16 position, may provide a signal as via transmission means 410 to control means 394. A source of electrical potential 412 along with related switch means 414 may be electrically connected as by conductor means 416 and 418 to control means 394.

Operation of the Invention

Generally, in the embodiment disclosed, fuel under pressure is supplied as by fuel pump means 32 to conduit 36 and chamber 38 (and regulated as to its pressure by regulator means 42) and such fuel is metered through the effective metering area of valve orifice means 72 to conduit portion 70 from where such metered fuel flows through restriction means 78 and into annulus 100 and ultimately through discharge port means 102 and to the engine 20. The rate of metered fuel flow, in the embodiment disclosed, will be dependent upon the relative percentage of time, during an arbitrary cycle time or elapsed time, that the valve member 376 is relatively close to or seated against orifice seat member 74 as compared to the percentage of time that the valve member 376 is relatively far away from the cooperating valve seat member 74.

This is dependent on the output to coil means 146 from control means 394 which, in turn, is dependent on the various parameter signals received by the control means 394. For example, if the oxygen sensor and transducer means 440 senses the need of a further fuel enrichment in the motive fluid being supplied to the engine and transmits a signal reflective thereof to the control means 394, the control means 394, in turn, will require that the metering valve 376 be opened a greater percentage of time as to provide the necessary increased rate of metered fuel flow. Accordingly, it will be understood that given any selected parameters and/or indicia of engine operation and/or ambient conditions, the control means 394 will respond to the signals generated thereby and respond as by providing appropriate energization and de-energization of coil means 146 (causing corresponding movement of valve member 376) thereby achieving the then required metered rate of fuel flow to the engine.

The prior art has employed relatively high pressures both upstream and downstream of the fuel metering means in an attempt to obtain sufficient fuel atomization within the induction passage means. Such have not proven to be successful.

In the system of FIG. 1 embodying the invention excellent fuel atomization characteristics are obtained even when the upstream unmetered fuel pressure is in the order of 10.0 p.s.i. (the prior art often employing upstream unmetered fuel pressures in the order of 40.0 p.s.i.).

That is, within the environment of the embodiment or assembly illustrated, conduit means 88 supplies at least most of the air needed to sustain idle engine operation when the throttle valve means 16 is closed. As can be seen a flow circuit is described by inlet 90 of conduit 88, conduit 88, passage means 70, passage means 82, annulus 100, orifice means 102 and engine intake manifold induction passage means 13; such, in the depicted embodiment, provides all of the air flow to the engine 20 required for idle engine operation. The restriction means 78 is of a size as to result in the flow through passage 82 being sonic during idle engine operation. The fuel which is metered by valve member 376 and injected into passage 70 mixes with the air as the metered fuel and air flow into inlet 84 of venturi nozzle-like means 78 and become accelerated to sonic velocity. The fuel within such fuel-air mixtures becomes atomized as it undergoes acceleration to sonic velocity and subsequent expansion in portion 86 of venturi means 78. The atomized fuel-air emulsion then passes into annulus 100 and is discharged, generally circumferentially of induction passage means 14, through the discharge port means 102 of diffuser means 94 and into passage means 13 of engine 20. In tne depicted embodiment, the restriction means 78 not only provides for sonic flow therethrough during idle engine operation but also provides for sonic flow therethrough during conditions of engine operation other than idle and, preferably, over at least most of the entire range of engine operation.

When further engine power is required, throttle valve means 16 is opened to an appropriate degree and the various related parameter sensing means create input signals to control means 394 resulting in fuel metering means 104 providing the corresponding increase in the rate of metered fuel to the passage 70 and, as hereinbefore described, ultimately to engine 20.

As should be apparent, suitable temperature responsive means may be provided in order to slightly open throttle valve 16 during cold engine idle operation in order to thereby assist in sustaining such cold engine idle operation and preclude rough engine operation.

Referring in greater detail to FIG. 3, wherein certain details may be rotated, about the central axis thereof, out of their normal positions for purposes of greater clarity, whenever the coil 146 is energized the resulting flux path is described, generally, by the tubular extension 210 of pole piece means 206, the flange-like body portion 208 of pole piece means 206, upper portion 286 of outer housing 120, wall portion 122 of outer housing 120, valve member 376 and guide shoe means 258 back to the tubular extension 210 of pole piece means 206. In this respect it should be noted that valve member 376 not only serves the function of a valving member but also provides an armature function in the overall system. Further, in the preferred embodiment the shoe-like member 258 also serves as an armature and, in the embodiment disclosed, may be considered as being a ring-like or annular armature. In any event, the armature ball valve 376 effectively "floats" in the bore or passage 274 to self-align itself to the seat surface 356 in the normally closed position. That is, when the coil 146 is de-energized, spring 372 forces guide means 242, annular armature 258 and armature ball valve 376 downwardly (as viewed in FIG. 3) causing the spherical portion of armature ball valve 376 to seat and close against cooperating surface 356 of seat means 74. In the event that the pole piece means 206 may be somewhat eccentrically aligned with respect to the axis of the housing 120 or the axis of seat surface 356 or the flux path is weakened in some area tending to cause the armature ball valve 376 to be misaligned with the surface 356 upon initial closing contact therewith, the cooperating flatted surfaces 270 (of annular armature 258) and 378 (of armature ball valve 376) enable such surfaces to undergo a sliding action with respect to each other thereby allowing the armature ball valve 376 to seek its fully seated position against cooperating valve seat surface 356.

When the coil 146 is energized and armature ball valve 376, annular armature 258 and guide means 242 are caused to move upwardly, against the resistance of spring means 372, the maximum amount of travel is determined by upper surface 250 of guide means flange 248 striking or abutting against the end surface 219 of pole piece means 206. As can be visualized in FIG. 3, when such abutting action takes place, an air gap still remains as between the upper annular surface 268 of armature shoe-like member 258 and end surface 219 of pole piece means 206. Such an air gap, in the preferred embodiment, may be in the order of 0.006 inch. Such a permanent working air gap, of course, assures that the armature means, more particularly annular armature 258, and the pole piece means 206 do not contact each other. This, in turn, allows for lower force levels when the coil means 146 is energized and reduced force decay time when the coil 146 is de-energized.

As already discussed, in the preferred embodiment a significant clearance exists as between the outer diameter of pole piece extension portion 210 and the inner diameter 186 of bobbin means 138. The same or similar clearance exists as between the annular armature 258 and the inner diameter 186 of bobbin 138. Further, as also already disclosed, in the preferred embodiment, a significant clearance exists as between the outer diameters of bobbin flange portions 142 and 144 and the inner diameter 136 of outer housing 120. The spaces between the foot-like means 188, 190, 192 and 194 of bobbin 138 provide for flow therebetween while the foot-like or pad means 188, 190, 192 and 194 serve to keep end surface 202 away from juxtaposed surface 200 of housing 120 thereby providing for flow therebetween. In the preferred embodiment fuel, as from chamber 38 (FIG. 1) not only flows through inlet means 276 but also flows through passage means 280, 282 and 284 filling all of such mentioned significant clearances and effectively envelope the coil means 146 thereby preventing the coil assembly 146 from becoming excessively hot.

Passages 228 and 230, communicating as between the inner passage 218 of pole piece means 206 and the clearance between extension 210 and inner diameter 186 of bobbin 138 prevent the occurrence of fuel being trapped within passage 218 of pole piece 206, generally between guide means 242 and the adjustment means 358, and hydraulically locking the guide means 242 against axial movement.

Passages 182 and 184, in bobbin flange 142, communicate as between the clearance existing between extension 210 and inner diameter 186 of bobbin 138. Accordingly, it should be apparent that in the preferred embodiment the various clearances and interconnecting passages and spaces provide for the circulation of fuel therethrough.

Further, as generally depicted in FIG. 1, in the preferred arrangement the chamber 108 receiving the metering assembly 104 is large enough as to enable the flow of fuel between such chamber 108 and the assembly 104 with external leakage of fuel being prevented by sealing means 106 and leakage past the metering assembly 104 and to the engine being prevented by sealing means 116. In such an arrangement, the fuel being permitted to circulate within the metering assembly 104 is placed in communication with the fuel in chamber 108 surrounding metering assembly 104 by means of the filter or venting means 300. In the event any fuel vapor forms within the metering assembly 104, the circulating fuel therein will eventually expel such vapor through the venting means 300 and into chamber 108 surrounding metering assembly 104.

Further, it should be made clear that the valving assembly 104 need not be employed in combination with an overall induction system as depicted in FIG. 1. The valving assembly 104 may be employed in combination with any other fuel-air engine induction system as, for example, where fuel is directly metered to each engine combustion chamber (this being done, for example, by injecting the fuel into the air stream at or near the respective engine intake valves) or by metering fuel as into or near a main engine throttle body which serves to control the flow of motive fluid to all of the engine combustion chambers.

Although only a preferred embodiment and selected modifications of the invention have been disclosed and described, it is apparent that other embodiments and modifications of the invention are possible within the scope of the appended claims.

What is claimed is:

1. A valving assembly for variably restricting fluid flow, comprising housing means, electrical field coil means a carried by said housing means, pole piece means situated generally within said filed coil means, a valve seat member, fluid-flow passage means formed through said valve seat valve seat member, said pole piece means comprising a pole piece annular axial end face portion, armature means, said armature means comprising a first armature member and a second armature member, wherein said second armature member is axially situated between and juxtaposed to said annular axial end face portion and to said first armature member, wherein said first armature member and said second armature member are physically separate members capable of movement relative to each other, said armature members being devoid of any mechanical coupling means interconnecting said armature members to each other, wherein said first armature member comprises a valve member effective for cooperative seating engagement with said valve seat member, wherein said second armature member is situated generally between said first armature member and said pole piece means, resilient means normally operatively resiliently urging said first armature member toward operative seating engagement with said valve seat member as to thereby terminate flow through said fluid-flow passage means, said first armature member comprising a flatted surface against which said second armature member is in operative engagement and through the action of said resilient means urges said first armature member toward said operative seating engagement with said valve seat member, wherein said first armature member is moved in an opening direction away from said valve seat member exclusively by the magnetic force generated by the energization of said electrical field coil means and acting upon said first armature member, and guide means, said guide means being movable toward and away from said valve seat member, wherein only said second armature member of said first and second armature members is carried by said guide means for movement in unison therewith, said guide means when moving in a direction away from said valve seat member being limited in movement by associated abutment means carried by said guide means and located as to be axially between said annular axial end face portion and said flatted surface of said first armature member, wherein said second armature member is fixedly carried by and exclusively dependent for guided movement by said guide means, wherein said second armature member is spaced from said aannular axial end face portion when said guide means moving in said direction away from said valve seat member engages said abutment means, and wherein when said second armature member is spaced from said annular axial end face portion upon engagement of said abutment means a void exists between said annular axial end face portion of said pole piece means and said second armature member.

2. A valving assembly according to claim 1 wherein said annular axial end face portion of said pole piece means comprises second abutment means, and wherein said second abutment means cooperates with said first mentioned abutment means to achieve abutting engagement as between said annular axial end face portion and said guide means.

3. A valving assembly according to claim 2 wherein said guide means is slidably received by a portion of said pole piece means.

4. A valving assembly for variably restricting fluid flow, comprising housing means, electrical field coil means carried by said housing means, pole piece means situated generally within said field coil means, a valve seat member, fluid-flow passage means formed through said valve seat member, said pole piece means comprising a pole piece annular axial end face portion, armature means, said armature means comprising a first armature member and a second armature member, wherein said second armature member is axially situated between and juxtaposed to said annular axial end face portion and to said first armature member, wherein said first armature member and said second armature member are physically separate members capable of movement relative to each other, said armature members being devoid of any mechanical coupling means interconnecting said armature members to each other, wherein said first armature member comprises a valve member effective for cooperative seating engagement with said valve seat member, wherein said second armature member is situated generally between said first armature member and said pole piece means, resilient means normally operatively resiliently urging said first armature member toward operative seating engagement with said valve seat member as to thereby terminate flow through said fluid-flow passage means, said first armature member comprising a flatted surface against which said second armature member is in operative engagement and through the action of said resilient means urges said first armature member toward said operative seating engagement with said valve seat member, wherein said first armature member is moved in an opening direction away from said valve seat member exclusively by the magnetic force generated by the energization of said electrical field coil means and acting upon said first armature member, and guide means, said guide means being movable toward and away from said valve seat member, wherein only said second armature member of said first and second armature members is carried by said guide means for movement in unison therewith, said guide means when moving in a direction away from said valve seat member being limited in movement by associated abutment means carried by said guide means and located as to be axially between said annular axial end face portion and said flatted surface of said first armature member, and wherein said guide means is comprised of non-magnetic material.

5. A valving assembly for variably restricting fluid flow, comprisirg housing means, electrical field coil means carried by said housing means, pole piece means situated generally within said field coil means, a valve seat member, fluid-flow passage means formed through said valve seat member, said pole piece means comprising a pole piece annular axial end face portion, armature means said armature means comprising a first armature member and a second armature member, wherein said second armature member is axially situated between and juxtaposed to said annular axial end face portion and to said first armature member, wherein said first armature member and said second armature member are physically separate members capable of movement relative to each other, said armature members being devoid of any mechanical coupling means interconnecting said armature members to each other, wherein said first armature member comprises a valve member effective for cooperative seating engagement with said valve seat member, wherein said second armature member is situated generally between said first armature member and said pole piece means resilient means normally operatively resiliently urging said first armature member toward operative seating engagement with said valve seat member as to thereby terminate flow through said fluid-flow passage means, said first armature member comprising a flatted surface against which said second armature member is in operative engagement and through the action of said resilient means urges said first armature member toward said operative seating engagement with said valve seat member, wherein said first armature member is moved in an opening direction away from said valve seat member exclusively by the magnetic force generated by the energization of said electrical field coil means and acting upon said first armature member, and guide means, said guide means being oscillatingly movable with respect to both said pole piece means and said valve seat member, wherein only said second armature member of said first and second armature members is carried by said guide means for movement in unison therewith, wherein said second armature member is of a ring-like configuration, wherein said second armature member comprises an axial end surface generally juxtaposed to said flatted surface, wherein said axial end surface of said second armature member has a ring-like projected area, wherein said guide means comprises an axial end, wherein said second armature member is carried by said guide means as to be situated generally peripherally about a portion of said guide means and generally circumscribe said axial end of said guide means, and wherein when said axial end surface of said second armature member is in contact with said flatted surface said axial end of said guide means is spaced from said flatted surface.

6. A valving assembly for variably restricting fluid flow, comprising housing means, electrical field coil means carried by said housing means, pole piece means situated generally within said field coil means, a valve seat member, fluid-flow passage means formed through said valve seat member, said pole piece means comprising a pole piece annular axial end face portion, armature means, said armature means comprising a first armature member and a second armature member, wherein said second armature member is axially situated between and juxtaposed to said annular axial end face portion and to said first armature member, wherein said first armature member and said second armature member are physically separate members capable of movement relative to each other, said armature members being devoid of any mechanical coupling means interconnecting said armature members to each other, wherein said first armature member comprises a valve member effective for cooperative seating engagement with said valve seat member, wherein said second armature member is situated generally between said first armature member and said pole piece means, resilient mens normally operatively resiliently urging said first armature member toward operative seating engagement with said valve seat member as to thereby terminate flow through said fluid-flow passage means, said first armature member comprising a flatted surface against which said second armature member is in operative engagement and through the action of said resilient means urges said first armature member toward said operative seating engagement with said valve seat member, wherein said first armature member is moved in an opening direction away from said valve seat member exclusively by the magnetic force generated by the energization of said electrical field coil means and acting upon said first armature member, and guide means, said guide means being movable toward and away from said valve seat member, wherein only said second armature member of said first and second armature members is carried by said guide means for movement in unison therewith, said guide means when moving in a direction away from said valve seat member being limited in movement by associated abutment means carried by said guide means and located as to be axially between said annnular axial end face portion and said flatted surface of said first armature member, wherein said associated abutment means comprises radially outwardly extending flange means carried by said guide means, wherein said second armature member is of ring-like configuration, wherein said second armature member comprises an axial end surface generally juxtaposed to said flatted surface, and wherein said axial end surface of said second armature member has a ring-like projected area.

7. A valving assembly for variably restricting fluid flow, comprising housing means, electrical field coil means carried by said housing means, pole piece means situated generally within said field coil means, a valve seat member, fluid-flow passage means formed through said valve seat member, said pole piece means comprising a pole piece annular axial end face portion, armature means, said armature means comprising a first armature member and a second armature member, wherein said second armature member is axially situated between and juxtaposed to said annular axial end face portion and to said first armature member, wherein said first armature member and said second armature member are physically separate members capable of movement relative to each other, said armature members being devoid of any mechanical coupling means interconnecting said armature members to each other, wherein said first armature member comprises a valve member effective for cooperative seating engagement with said valve seat member, wherein said second armature member is situated generally between said first armature member and said pole piece means, resilient means normally operatively resiliently urging said first armature member toward operative seating engagement with said valve seat member as to thereby terminate flow through said fluid-flow pasage means, said first armature member comprising a flatted surface against which said second armature member is in operative engagement and through the action of said resilient means urges said first armature member toward said operative seating engagement with said valve seat member, wherein said first armature member is moved in an opening direction away from said valve seat member exclusively by the magnetic force generated by the energization of said electrical field coil means and acting upon said first armature member, and guide means, said guide means being oscillatingly movable with respect to both said pole piece means and said valve seat member, wherein only said second armature member of said first and second armature members is carried by said guide means for movement in unison therewith, wherein said guide means when moving in a direction away from said valve seat member being limited in its movement by associated abutment means carried by said guide means, wherein said associated abutment means comprises radially outwardly extending shoulder means carried by said guide means, wherein said second armature member is of a generally tubular configuration having axially spaced first and second ends, wherein said first end of said generally tubular second armature member is generally juxtaposed to said flatted surface, wherein said second end of said generally tubular second armature member is generally juxtaposed to said pole piece aixal end portion, wherein said shoulder means is effective to abut against said a pole piece means in order to limit the movement of said guide means in said direction away from said valve seat member, and wherein when said shoulder means abuts against said pole piece means to limit the movement of said guide means in said direction away from said valve seat member said second end of said generally tubular second armature member is held in axially spaced relationship to said pole piece annular axial end face portion as to thereby define a void between said second end of said generally tubular second armature member and said pole piece annular axial end face portion.

8. An electromagnetic valving assembly, comprising electrical coil means, pole piece means, a pole piece end face, a guide member axially slidable with respect to said pole piece means and guided exclusively thereby, a first annular armature member fixedly carried by said guide member for movement in unison therewith, a flange portion carried by said guide member and extending generally transversely thereof, fluid-flow passage means, valve seat means formed generally about said fluid-flow passage means, a second armature member serviing as a valve member to at times be seated on said valve seat means and thereby prevent flow through said fluid-flow passage means, wherein said first and second armature members are physically separate members relatively movable with respect to each other and not operatively connected to each other by any mechanical coupling means, spring means for moving said guide member and thereby moving said first armature member against said second armature member to cause said second armature member to become seated on said valve seat means, wherein upon energization of said electrical coil means a flux field is generated casuing said guide member and first and second armature members to be moved away from said valve seat means and to a fully opened position against the resilient resisting force of said spring means, wherein said resilient resisting force is overcome by the force generated by said flux field acting upon both said first and second armature members, wherein the force required to move only said second armature member to said fully opened position is exclusively generated by said flux field acting only on said second armature member, and wherein when in said fully opened position said flange portion abuts against said pole piece end face and an annular air gap exists axially between said pole piece end face and said first armature member while a second air gap exists as between said guide member and said second armature member, said second air gap being determined by abutting engagement between said first and second armature members.

9. A valving assembly for variably restricting fluid flow, comprising housing means, electrical field coil means carried by said housing means, pole piece means situated generally within said field coil means, a valve seat member, fluid-flow passage means formed through said valve seat member, said pole piece means comprising a pole piece annular axial end face portion, armature means, said armature means comprising a first armature member and a second armature member, wherein said second armature member is axially situated between and juxtaposed to said annular axial end face portion and to said first armature member, wherein said first armature member and said second armature member are physically separate members capable of movement relative to each other, said armature members being devoid of any mechanical coupling means interconnecting said armature members to each other, wherien said first armature member comprises a valving portion effective for cooperative seating engagement with said valve seat member, wherein said second armature member is situated generally between said first armature member and said pole piece means, resilient means normally operatively resiliently urging said first armature member toward operative seating engagement with said valve seat member as to thereby terminate flow through said fluid-flow passage means, said first armature member comprising a flatted surface aganist which said second armature member is in operative engagement and through the action of said resilient means urges said first armature member toward said operative seating engagement with said valve seat member, wherein said first armature member is moved in an opening direction away from said valve seat member exclusively by the magnetic force generated by the energization of said electrical field coil means and acting upon said first armature member, and guide means, said guide means being movable toward and away from said valve seat member, wherein only said second armature member of said first and second armature members is carried by said guide means for movement in unison therewith, and wherein said guide means is comprised of non-magnetic material.

10. A valving assembly for variably restricting fluid flow, comprising housing means, electrical field coil means carried by said housing means, pole piece means situated generally within said field coil means, a valve seat member, fluid-flow passage means formed through said valve seat member, said pole piece means comprising a pole piece annular axial end face portion, armature means, said armature means comprising a first armature member and a second armature member, wherein said second armature member is axially situated between and juxtaposed to said annular axial end face portion and to said first armature member, wherein said first armature member and said second armature member are physically separate members capable of movement relative to each other, said armature members being devoid of any mechanical coupling means interconnecting said armature members to each other, wherein said first armature member comprises a valve member effective for cooperative seating engagement with said valve seat member, wherein said second armature member is situated generally between said first aramature member and said pole piece means, and resilient means normally operatively resiliently urging said first armature member toward operative seating engagement with said valve seat member as to thereby terminate flow through said fluid-flow passage means, said first armature member comprising a flatted surface against which said second armature member is in operative engagement and through the action of said resilient means urges said first armature member toward said operative seating engagement with said valve seat member, wherein said first armature member is moved in an opening direction away from said valve seat member exclusively by the magnetic force generated by the energization of said electrical field coil means and acting upon said first armature member, and further comprising guide means, said guide means being oscillatingly movable with respect to both said pole piece means and said valve seat means, wherein said second armature member is of generally tubular configuration and is fixedly situated about said guide means, said second armature member comprising an armature annular end face juxtaposed to and effective for said operative engagement with said flatted surface, said guide means being spaced from said flatted surface of said first armature member when said armature annular end face is in said operative engagement with said flatted surface.

* * * * *